Jan. 3, 1939.     A. H. KOZA     2,142,791
PLASTIC FAUCET HANDLE
Filed July 13, 1938
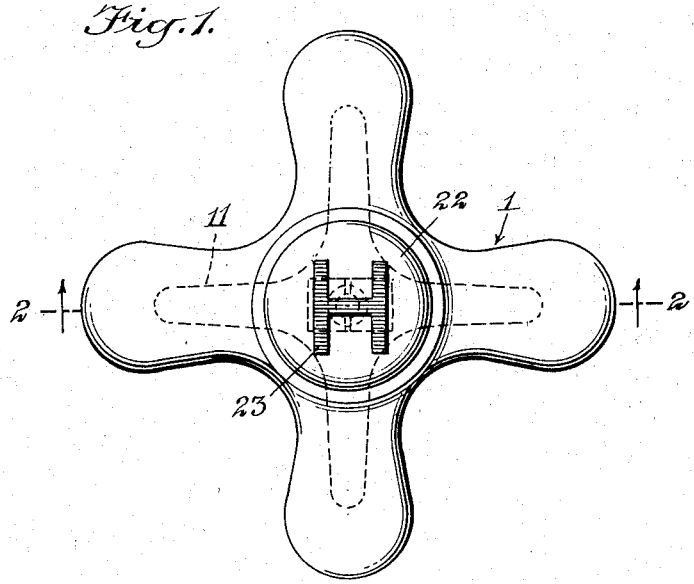
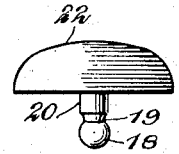
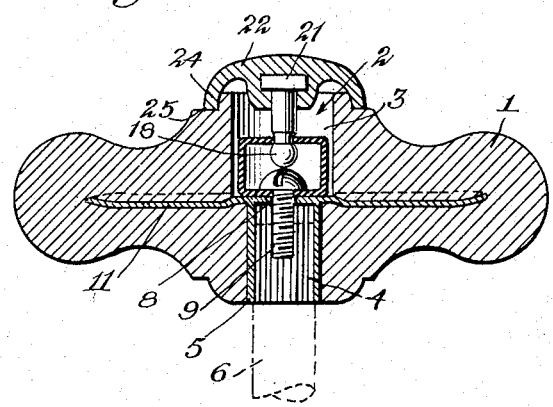
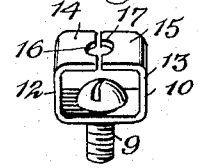
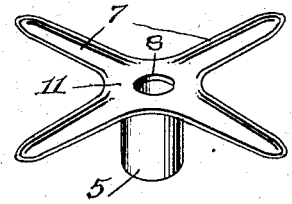
INVENTOR
Albert H. Koza Patented Jan. 3, 1939

2,142,791

UNITED STATES PATENT OFFICE 2,142,791

PLASTIC FAUCET HANDLE

Albert H. Koza, Cuyahoga Falls, Ohio

Application July 13, 1938, Serial No. 218,976

3 Claims. (Cl. 40—8)

This invention relates to a handle and particularly an improved handle adapted to be used on faucets for wash basins and the like, an object being to provide a construction which is substantially non-breakable and which may be readily applied or removed.

Another object of the invention is to provide a faucet handle which is formed of plastic material and in which is embodied certain metal parts whereby the handle may be readily connected or disconnected.

A further object more specifically is to provide a faucet handle having a bore for accommodating a metal structure and means for removably securing a cap over said bore.

In the accompanying drawing—

Fig. 1 is a top plan view of a faucet handle disclosing an embodiment of the invention;

Fig. 2 is a sectional view through Fig. 1 approximately on the line 2—2;

Fig. 3 is a side view of the cap shown in Figs. 1 and 2;

Fig. 4 is a perspective view of a spring clamp used for holding the cap in functioning position;

Fig. 5 is a perspective view of a metal tubular connecting member having radiating arms designed to be embedded in a composition body as shown in Figs. 1 and 2.

Referring to the accompanying drawing by numerals, 1 indicates a plastic composition body which is preferably what is known as non-breakable material. This is made in a cross formation but it could be made in other shapes without departing from the spirit of the invention. A bore 2 is provided in body 1, which bore is shown as provided with a large part or section 3 and a smaller part or section 4 though, if desired, the bore could be of the same diameter throughout. A tubular member 5 rather snugly fits into the smaller part 4 and is preferably molded in place with the arms 7 attached. The arms 7 are also preferably molded in the body 1 at the same time as the tubular part 4. The interior of the tubular member 5 is fluted so as to receive the fluted end of the faucet stem 6. It will be understood, of course, that instead of being fluted the parts could be made square or some other shape.

The tubular member 5 carries a plurality of arms 7 which may be separate and rigidly secured to the tubular member 5, or may be made integral therewith. These arms are arc-shaped in cross section so that when they are embedded, as shown in Fig. 2, any twisting action on the body 1 will be communicated to these arms and thence to the tubular member 5. The arms 7 merge together at a central point but leave a central opening 8 through which a screw 9 extends. This screw is adapted to firmly secure the tubular member 5 to the stem 6.

In the large part 3 of bore 2 there is provided a spring clamp 10 which has a central opening at the bottom through which the screw 9 extends, whereby when the screw is screwed down into functioning position the clamp 10 will be clamped tightly against the surface 11 of the arms 7. The clamp 10 is provided with upstanding sections 12 and 13 which are bent inwardly to form clamping arms 14 and 15. These arms are provided with notches 16 and 17 whereby there is an opening provided which will permit a screwdriver to be passed through the clamping member 10 into the kerf of the screw 9 and the latter screwed into proper functioning position. The clamping arms 14 and 15 normally remain as shown in Fig. 4 but may be spread apart when the ball 18 is forced therebetween. This ball or round portion merges into a restricted neck 19 which in turn merges into the main stem 20 having an enlarged end 21 embedded in a cap 22. This cap is provided with identifying inscription 23 for indicating whether the water is hot or cold, or any other fact that may be desired. Cap 22 is provided with an annular depending flange 24 which is adapted to rest against the annular shoulder 25 when the parts are in full functioning position.

After the screw 9 has been screwed down to its proper functioning position the cap 22 is merely moved downwardly and the ball 18 forced through the notches 16 and 17. This will cause the jaws 14 and 15 to move apart and then move together or as near back to their normal position as possible for holding the cap properly in place while permitting the same to be rotated so that the inscription 23 may be adjusted to the correct position.

When the cap is to be removed it may be grasped and pulled bodily out of its functioning position and then a screw-driver may be inserted into the kerf of screw 9 for removing the screw when it is desired to remove the handle from the stem 6.

It will be observed that the arms 7 are embedded in the body 1 and this is done during the manufacture of the device by having the body cast around the arms in any desired way when the arms are molded. The cap 22 may be of molded or other material as preferred, but the stem 20 and associated parts, clamp 10, screw 9, tubular member 5, and arms 7 are all preferably of metal.

I claim:

1. A handle for faucets comprising a body of plastic material, a tubular metal part adapted to fit over the end of a faucet stem, a plurality of arms extending from the tubular part radially into said body, a screw for securing said metal part to said stem, a resilient notched member held in functioning position by said screw, and an inscription-carrying cap positioned over said notched member formed with a ball end rotatably fitted into the notch in said notched member.

2. A handle including a body formed of a plastic composition and provided with a bore extending therethrough, part of said bore being smaller than the other part, a metal tubular member fitted into the smaller part of said bore, a plurality of radiating arms extending from said tubular member into said body, said arms extending over part of said tubular member but leaving an opening, a screw extending through said opening for securing the handle to the stem of a faucet, an inscription-carrying cap positioned over said bore, and resilient means held in functioning position by said screw for holding said cap in position on said body.

3. A handle comprising a body having a bore extending therethrough centrally, means partly embedded in said body and partly in said bore for holding the handle in functioning position, a removable inscription-carrying cap covering said bore, said cap having a depending pin formed with a neck merging into a ball on the free end, and a pair of slightly spaced resilient gripping members arranged in said bore positioned to snap over said ball when the cap is forced into functioning position whereby said gripping members function to hold the cap in functioning position.

ALBERT H. KOZA.